United States Patent
Kyle et al.

(10) Patent No.: US 6,470,996 B1
(45) Date of Patent: Oct. 29, 2002

(54) WIRELINE ACOUSTIC PROBE AND ASSOCIATED METHODS

(75) Inventors: Donald Kyle, Plano, TX (US); Vimal Shah, Sugar Land, TX (US)

(73) Assignee: Halliburton Energy Services, Inc., Dallas, TX (US)

(*) Notice: Subject to any disclaimer, the term of this patent is extended or adjusted under 35 U.S.C. 154(b) by 0 days.

(21) Appl. No.: 09/540,000

(22) Filed: Mar. 30, 2000

(51) Int. Cl.[7] ................................ G01V 1/40
(52) U.S. Cl. ................ 181/103; 181/108; 367/25
(58) Field of Search .................. 181/102, 105, 181/106, 108, 110, 111, 112, 113, 119, 120, 122, 124; 367/25, 31, 81–85; 340/853.7, 854.4

(56) References Cited

U.S. PATENT DOCUMENTS

| | | | |
|---|---|---|---|
| 4,450,540 A | * 5/1984 | Mallet | 181/102 |
| 5,724,308 A | * 3/1998 | Sorrells et al. | 367/25 |
| 5,914,911 A | 6/1999 | Babour | |
| 5,941,307 A | 8/1999 | Tubel | |
| 5,995,499 A | 11/1999 | Hottinen et al. | |
| 6,114,972 A | * 9/2000 | Smith | 367/31 |

* cited by examiner

Primary Examiner—Khanh Dang
(74) Attorney, Agent, or Firm—Paul I. Herman; Marlin R. Smith

(57) ABSTRACT

A wireline acoustic probe and associated methods provide enhanced calibration and communication capabilities in a downhole acoustic communication system. In a described embodiment, an acoustic probe is conveyed on a wireline to a position proximate a downhole acoustic transmitter. A command is transmitted acoustically from the probe to the transmitter, causing the transmitter to generate acoustic frequency sweeps. The sweeps are received by the probe proximate a downhole acoustic receiver, permitting an optimum acoustic transmission frequency to be selected.

38 Claims, 3 Drawing Sheets

WIRELINE ACOUSTIC PROBE AND ASSOCIATED METHODS

BACKGROUND OF THE INVENTION

The present invention relates generally to downhole acoustic communication systems and, in an embodiment described herein, more particularly provides an acoustic probe conveyed on a wireline to facilitate calibration and communication in an acoustic communication system.

It is well known to communicate acoustically downhole by transmitting acoustic signals through a tubular string positioned in a wellbore of a well. Components of an acoustic communication system are typically interconnected in the tubular string, so that the components communicate with each other by transmitting acoustic signals through the tubular string extending between the components. The tubular string between the components may be made up of various tubular elements having, for example, differing wall thickness, length, etc. In addition, for different wells with different spacings between the components, the number of connections in the tubular string between the components varies.

Unfortunately, the variations in the tubular string material, length, number of connections, etc., between the components makes it difficult to determine beforehand an optimum frequency for acoustic communication between the components. One aspect of the difficulty is that, prior to interconnecting the acoustic communication system in the tubular string, the variations in the tubular string may not be known. Furthermore, after the tubular string has been installed in the well, with the acoustic communication system interconnected therein, it may not be possible to make adjustments to the acoustic frequency used for transmission in the system, and so a preselected frequency must be used, even though it is less than optimum.

SUMMARY OF THE INVENTION

In carrying out the principles of the present invention, in accordance with an embodiment thereof, an acoustic communication system is provided which utilizes an acoustic wireline probe. Associated methods are also provided.

In one aspect of the present invention, the acoustic probe is capable of acoustically communicating with components of a downhole acoustic communication system interconnected in a tubular string positioned in a well. For this purpose, the probe may include a piezoelectric device for transmitting acoustic commands to the system components. In addition, the probe may include an accelerometer for receiving acoustic signals transmitted from the system components.

In another aspect of the present invention, the probe may be utilized in a method of calibrating the communication system. For example, the probe may be positioned proximate a transmitter of the system and the probe may acoustically command the transmitter to generate acoustic frequency sweeps. The probe may then be positioned proximate a receiver of the system, where the probe receives the frequency sweeps. The received frequency sweeps may be analyzed to determine an optimum frequency for communication between the transmitter and the receiver. The probe may then be positioned proximate the transmitter, where the probe commands the transmitter to use the optimum frequency for subsequent communication with the receiver. In this manner, the system may be calibrated so that it uses the optimum frequency for acoustic communication, after the system has been installed in the well.

In another aspect of the present invention, the probe has the capability of transmitting acoustic signals received by it in either analog or digital form. For example, it may be desirable, for diagnostic purposes, for an operator at the surface to be able to hear the "raw" acoustic signals received by the probe downhole. This is accomplished by the probe transmitting the received acoustic signals via a wireline in analog electrical form. Where a digital form of received acoustic signals is desired, such as for data analysis, the probe may include an onboard digital signal processor, so that the received acoustic signals are transmitted via the wireline in digital electrical form.

In still another aspect of the present invention, the acoustic communication system is configured in a unique manner which facilitates its use with the probe. The transmitter is interconnected in the tubular string above a packer and a valve in the string. In this manner, even though the valve may be closed, preventing fluid flow through the tubular string, the probe may still be positioned proximate the transmitter for communication therewith, and communication with other components in the string is enhanced. The transmitter may include a sensor sensing a property of a fluid disposed below the packer.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
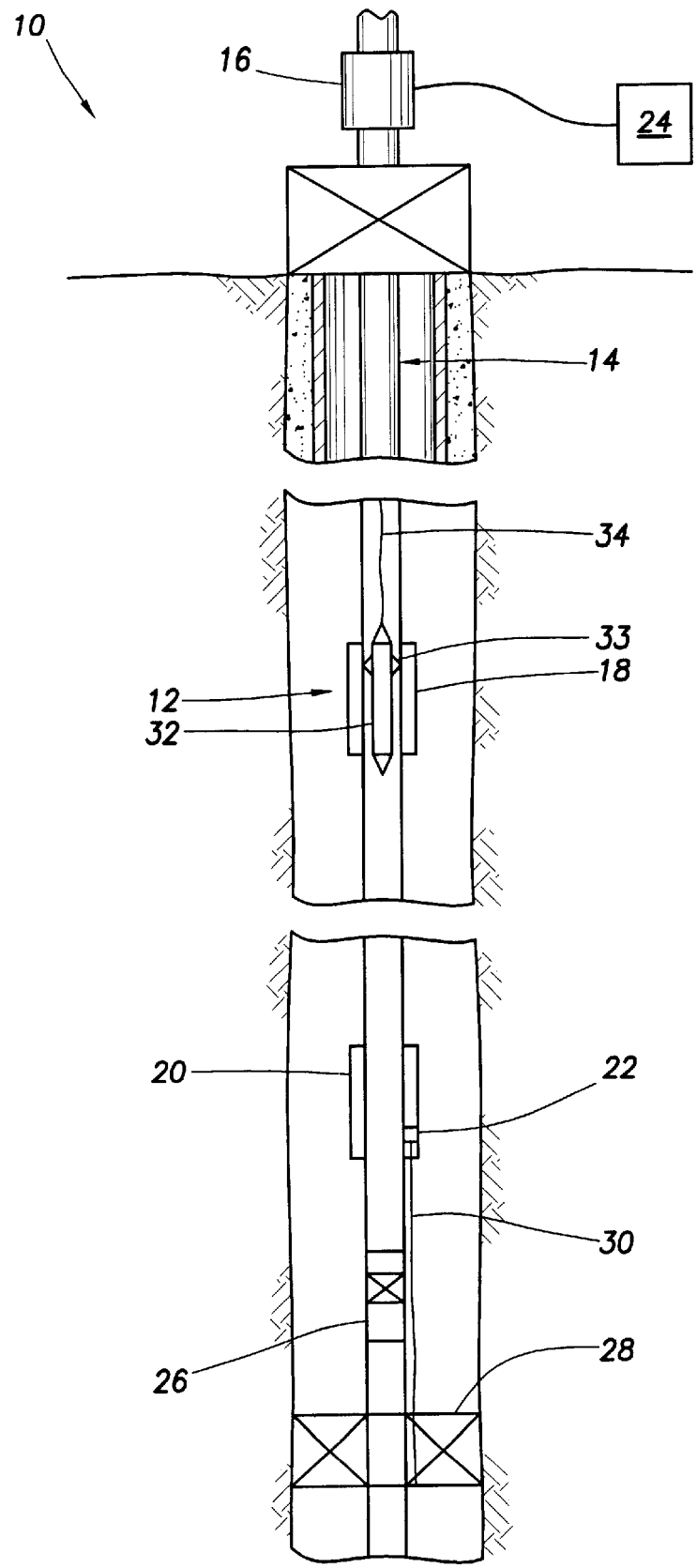
FIG. 1 is a schematic partially cross-sectional view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein maybe utilized in various orientations, such as inclined, inverted, horizontal, vertical, etc., and in various configurations, without departing from the principles of the present invention.

In the method 10, a downhole acoustic communication system 12 has been installed in a well. Components of the communication system 12 are interconnected in a tubular string 14 disposed in the well. These components include a transceiver 16, a repeater 18 and a transmitter 20, thusly named according to the functions which the respective components normally perform in the communication system 12. However, it is to be clearly understood that each of the components may have both acoustic transmission and reception capabilities.

The transmitter 20 normally collects data from sensors, such as sensor 22, and transmits the data to the repeater 18. The repeater 18 receives the data and retransmits it to the transceiver 16. The transceiver 16 receives the data and communicates it to a surface computer or control terminal 24.

The transmitter 20 is interconnected in the tubular string 14 above a valve 26 and a packer 28. For measurement of a property, such as temperature or pressure, of a fluid below the packer 28, the sensor 22 is in communication with the fluid via a passage, such as a tube 30, extending from the sensor to below the packer. Of course, the sensor 22 could be positioned below the packer 28 with wires permitting communication between the sensor and the remainder of the transmitter 20, without departing from the principles of the present invention.

Note that the configuration of the communication system 12 as depicted in FIG. 1 is especially useful in operations such as formation testing, where the valve 26 may be closed to allow buildup of formation pressure, and the valve may be opened to permit drawdown of formation pressure. These pressure changes may be sensed by the sensor 22 and transmitted to the surface (along with other data, such as temperature, etc.) using the communication system 12.

Positioning the transmitter 20 above the valve 26 and the packer 28 provides several advantages. For example, the transmitter 20 does not have to transmit an acoustic signal to the repeater 18 through the valve 26 or the packer 28, and is instead positioned somewhat closer to the repeater. As another example, such placement of the transmitter 20 permits an acoustic probe 32 to be conveyed on wireline 34 through the tubular string 14 and into the transmitter, even though the valve 26 may be closed. However, it is to be clearly understood that the communication system 12 may be differently configured, without departing from the principles of the present invention. Furthermore, the probe 32 may be otherwise conveyed, for example, it could be conveyed by coiled tubing, etc.

Preferably, the transceiver 16, repeater 18 and transmitter 20 are programmed prior to being installed in the well, so that they may communicate with each other using one or more acoustic frequencies determined by expected characteristics of the tubular string 14. Since the tubular string 14 between the transceiver 16 and repeater 18 is typically different from the tubular string between the repeater and the transmitter 20, different frequencies may be used for transmission in these different portions of the tubular string. For example, the transmitter 20 may transmit data to the repeater 18 at one frequency, and the repeater may transmit the data to the transceiver 16 at another frequency.

In the method 10, use of the probe 32 enables the communication system 12 to be calibrated so that it utilizes the optimum frequency for acoustic communication through each respective portion of the tubular string 14. In this manner, an optimum frequency for communication between the transmitter 20 and repeater 18 may be determined and utilized, and another optimum frequency for communication between the repeater 18 and transceiver 16 may be determined and utilized.

The probe 32 is initially positioned proximate the repeater 18. Preferably, the probe 32 is positioned inside the repeater 18 for maximum acoustic coupling via the metal of a centralizer 33 attached to the probe, but this is not necessary in the method 10. The centralizer 33 extends between the probe 32 and the repeater 18, or otherwise provides acoustic coupling between the probe and the tubular string 14. However, it is to be understood that acoustic coupling between the probe 32 and the repeater 18 may be accomplished by other means, without departing from the principles of the present invention.

In one unique aspect of the probe 32, it is capable of transmitting, rather than merely receiving, acoustic signals.

To initiate the calibration process, the probe 32 transmits a command to the repeater 18, causing the repeater to generate repetitious acoustic frequency sweeps, that is, the repeater repeatedly transmits a broad range of acoustic frequencies through the tubular string 14.

Figure 2:
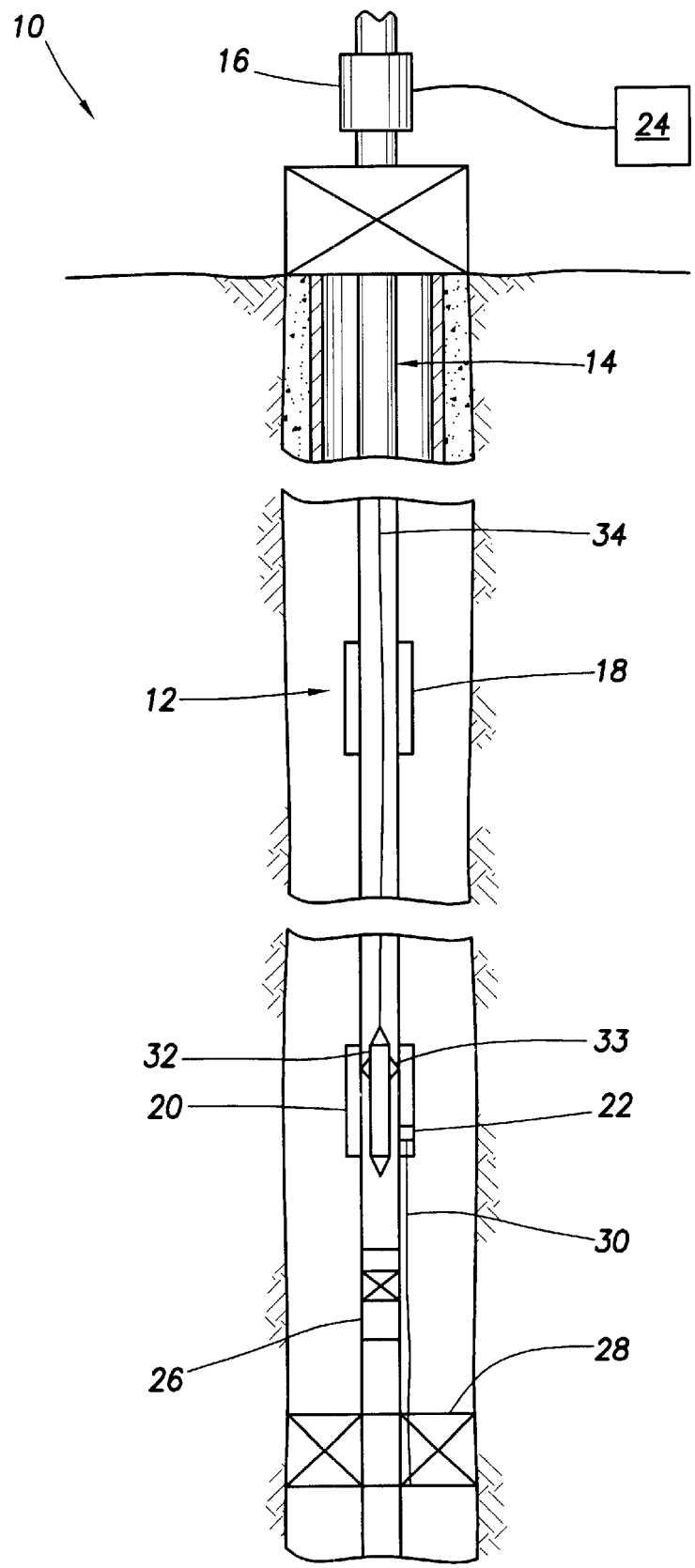
FIG. 2 is a schematic partially cross-sectional view of the method of FIG. 1, wherein further steps in the method have been performed.

The probe 32 is then repositioned in the tubular string 14, so that it is proximate the transmitter 20. FIG. 2 depicts the probe 32 positioned inside the transmitter 20. Again, it is preferable that the probe 32 be positioned inside the transmitter 20, but this is not necessary.

While positioned proximate the transmitter 20, the probe 32 receives the frequency sweeps generated by the repeater 18 and transmitted through the tubular string 14. Acoustic coupling between the probe 32 and the tubular string 14 is provided by the metal of the centralizer 33, but as discussed above, other means of providing acoustic coupling may be used, without departing from the principles of the present invention.

The probe 32 transmits the received frequency sweeps to the surface via the wireline 34 for analysis. For example, frequency spectrum analysis software, such as SpectraPlus™, may be used to select one or more optimum frequencies having high amplitudes at the transmitter 20 as compared to other frequencies. As used herein, the term "optimum" is used to describe a frequency having a comparatively high amplitude as transmitted through a portion of a tubular string.

The transceiver 16 receives the frequency sweeps transmitted from the repeater 18 through the tubular string 14 to the surface. The received frequency sweeps are then analyzed to select an optimum frequency for communication between the repeater 18 and the transceiver 16. Thus, the method 10 permits an optimum frequency to be determined for communication between the repeater 18 and the transmitter 20, and permits an optimum frequency to be determined for communication between the repeater and the transceiver 16, although these optimum frequencies may be different from each other.

Once the optimum frequencies have been determined, the probe 32 transmits a command acoustically to the transmitter 20 to cause the transmitter to use the appropriate optimum frequency for communication between the repeater 18 and transmitter 20. The probe 32 is then positioned proximate the repeater 18. The probe 32 acoustically transmits a command to the repeater 18 to cause the repeater to use the appropriate optimum frequency for communication between the repeater and transmitter 20, and to use the appropriate optimum frequency for communication between the repeater and the transceiver 16. The transceiver 16 may be reprogrammed at the surface, using the computer 24, to use the appropriate optimum frequency for communication between the repeater 18 and the transceiver.

As an alternate calibration method, the computer 24 could be used to cause the transceiver 16 to generate frequency sweeps, which are received proximate the repeater 18 by the probe 32. The probe 32 could then be positioned proximate the transmitter 20, which could be commanded by the probe to generate frequency sweeps. These frequency sweeps could be received by the probe 32 positioned proximate the repeater 18. The frequency sweeps as received by the probe 32 could be analyzed to determine optimum frequencies for transmission in the portions of the tubular string 14 as described above. The probe 32 may then be used to reprogram the repeater 18 and transmitter 20 to use the optimum frequencies for transmission in the respective tubular string portions. Therefore, it may be seen that the particular order and direction of frequency sweep generation and reception may be varied in the method 10, without departing from the principles of the present invention.

The communication system 12 is, thus, calibrated to use optimum frequencies for communication in the method 10. Additionally, the method 10 permits calibration of the system 12 so that it uses different frequencies for communication in different portions of the tubular string 14. Furthermore, the method 10 permits the system 12 to be calibrated after it has been interconnected in the tubular string 14 and installed in the well.

The probe 32 includes unique features which enhance its usefulness in the method 10 and in the communication system 12. Due to its ability to transmit acoustic signals, the probe 32 may be used to transmit information or instructions to the repeater 18 or transmitter 20 downhole, before optimum frequencies have been determined for transmission through the tubular string 14. Therefore, even though it may not initially be possible for the transmitter 20 to communicate with the repeater 18 for exchange of data or instructions, the probe 32 may be used to communicate with either of them.

Due to the ability of the probe 32 to transmit received acoustic signals to the surface or another remote location via the wireline 34, the probe may be used to communicate downhole, even though there may be a problem with the acoustic communication system 12. For example, the probe 32 may be positioned proximate the transmitter 20 for download of data stored therein. In this situation, the probe 32 commands the transmitter 20 to acoustically transmit data stored therein, such as indications of fluid properties sensed by the sensor 22. The data received by the probe 32 is transmitted via the wireline 34 directly to the surface.

Figure 3:
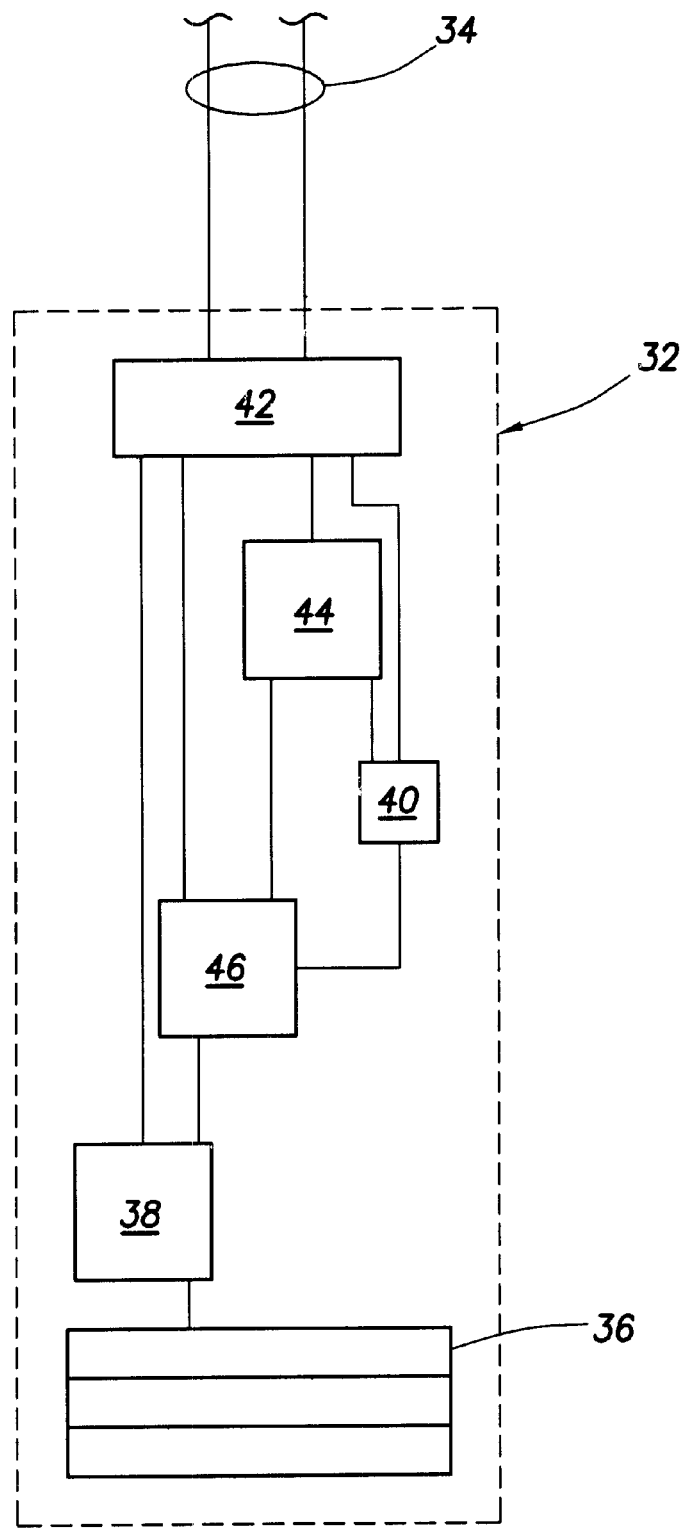
FIG. 3 is a schematic block diagram of a wireline acoustic probe embodying principles of the present invention.

Referring now to FIG. 3, a schematic diagram of the probe 32 is representatively illustrated. The probe 32 includes a stack of piezoelectric crystals 36 and a stack driver 38 for transmitting acoustic signals. The probe 32 also includes an accelerometer 40 for receiving acoustic signals.

The accelerometer 40 and stack driver 38 are connected to an interface board 42 for electrical communication with the wireline 34. Thus, electrical signals on the wireline 34 may be used to cause the stack driver 38 to actuate the piezoelectric stack 36 to transmit an acoustic signal, and acoustic signals received by the accelerometer 40 may be transmitted to the surface via the wireline.

The probe 32 includes a digital signal processor 44 for converting the raw acoustic signal received by the accelerometer 40 into digital electrical form before being transmitted to the surface via the wireline 34. The signal processor 44 is interconnected between the accelerometer 40 and the interface board 42. However, the accelerometer 40 is also directly connected to the interface board 42 so that, when desired, the raw acoustic signal may be transmitted in analog electrical form via the wireline 34, for example, for diagnostic purposes.

A power supply 46 receives power from the wireline 34 via the interface board 42 and converts it as needed to power the driver 38, accelerometer 40 and processor 44. However, a battery or other type of power source, and any additional power source, may be used in the probe 32, without departing from the principles of the present invention.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of calibrating a downhole acoustic communication system, the method comprising the steps of:
   positioning a probe proximate an acoustic transmitter of the downhole acoustic communication system;
   acoustically transmitting a first command from the probe to the transmitter; and
   generating an acoustic frequency sweep from the transmitter in response to the first command.

2. The method according to claim 1, further comprising the steps of:
   positioning the probe proximate an acoustic receiver of the downhole acoustic communication system; and
   receiving the acoustic frequency sweep by the probe.

3. The method according to claim 2, further comprising the step of selecting an optimum acoustic transmission frequency from the acoustic frequency sweep received by the probe.

4. The method according to claim 3, further comprising the steps of:
   positioning the probe proximate the acoustic transmitter after the receiving step; and
   acoustically transmitting a second command from the probe to the acoustic transmitter, thereby causing the transmitter to transmit to the receiver utilizing the optimum frequency.

5. The method according to claim 3, further comprising the step of acoustically transmitting a second command from the receiver to the transmitter, thereby causing the transmitter to transmit to the receiver utilizing the optimum frequency.

6. The method according to claim 1, wherein the downhole acoustic communication system includes first and second axially spaced apart acoustic receivers, and further comprising the steps of:
   receiving the frequency sweep at each of the first and second receivers;
   selecting a first optimum acoustic transmission frequency from the acoustic frequency sweep as received at the first receiver for transmission from the transmitter to the first receiver; and
   selecting a second optimum acoustic transmission frequency from the acoustic frequency sweep as received at the second receiver for transmission from the transmitter to the second receiver.

7. The method according to claim 6, wherein in the positioning step, the transmitter is interconnected in a tubular string between the first and second receivers.

8. The method according to claim 1, wherein in the positioning step, the probe is conveyed on a wireline.

9. The method according to claim 8, further comprising the steps of:
   receiving an acoustic signal by the probe; and
   transmitting the signal in analog electrical form to a remote location via the wireline.

10. The method according to claim 8, further comprising the steps of:
    receiving an acoustic signal by the probe;
    converting the acoustic signal to digital electrical form in the probe; and transmitting the signal in digital electrical form to a remote location via the wireline.

11. The method according to claim 1, wherein in the positioning step, the transmitter is interconnected in a tubular string above a packer and a valve, the transmitter including a sensor sensing a property of a fluid disposed below the packer and valve, and the sensor being in communication with the fluid via a passage extending from the transmitter to below the packer.

12. The method according to claim 1, wherein in the positioning step, the transmitter is interconnected in a tubular string above a closed valve preventing fluid flow through the tubular string, the transmitter including a sensor sensing a property of a fluid disposed below the valve, and the sensor being in communication with the fluid via a passage extending from the transmitter to below the valve.

13. A downhole acoustic communication system for a well having a tubular string disposed therein, the system comprising:

an acoustic receiver interconnected in the tubular string;

a probe reciprocably and operatively received within the tubular string, the probe transmitting an acoustic signal to the receiver, the probe being conveyed on a wireline for reciprocal displacement within the tubular string, the probe transmitting the acoustic signal in analog electrical form to a remote location via the wireline; and an acoustic transmitter interconnected in the tubular string, the transmitter transmitting an acoustic signal received by the probe.

14. A downhole acoustic communication system for a well having a tubular string disposed therein, the system comprising:

an acoustic receiver interconnected in the tubular string;

a probe reciprocably and operatively received within the tubular string, the probe transmitting an acoustic signal to the receiver, the probe being conveyed on a wireline for reciprocal displacement within the tubular string; and an acoustic transmitter interconnected in the tubular string, the transmitter transmitting an acoustic signal received by the probe, the probe including a digital signal processor converting the acoustic signal to digital electrical form, and wherein the signal is transmitted to a remote location via the wireline in digital electrical form.

15. A downhole acoustic communication system for a well having a tubular string disposed therein, the system comprising:

an acoustic receiver interconnected in the tubular string;

a probe reciprocably and operatively received within the tubular string, the probe transmitting an acoustic signal to the receiver; and an acoustic transmitter interconnected in the tubular string above a valve preventing fluid flow through the tubular string, the transmitter including a sensor in fluid communication with fluid below the valve via a passage extending from the transmitter to below the valve, and the transmitter acoustically transmitting to the probe an indication of a property of the fluid sensed by the sensor.

16. A downhole acoustic communication system for a well having a tubular string disposed therein, the system comprising:

an acoustic receiver interconnected in the tubular string;

a probe reciprocably and operatively received within the tubular string, the probe transmitting an acoustic signal to the receiver; and an acoustic transmitter interconnected in the tubular string above a packer and a valve, the transmitter including a sensor in fluid communication with fluid below the packer via a passage extending from the transmitter to below the packer, and the transmitter acoustically transmitting to the probe an indication of a property of the fluid sensed by the sensor.

17. A downhole acoustic communication system, comprising:

a probe reciprocably and operatively receivable within a tubular string, the probe receiving an acoustic signal, converting the acoustic signal to a digital electrical signal, and transmitting the digital electrical signal to a remote location.

18. The system according to claim 17, wherein the probe is conveyed on a wireline.

19. The system according to claim 17, wherein the acoustic signal is transmitted to the probe from an acoustic transmitter interconnected in the tubular string.

20. The system according to claim 19, wherein the transmitter transmits the signal to the probe in response to a command transmitted from the probe to the transmitter.

21. The system according to claim 20, wherein the command is transmitted acoustically from the probe to the transmitter.

22. The system according to claim 19, wherein the transmitter is interconnected in the tubular string above a valve preventing fluid flow through the tubular string, the transmitter including a sensor in fluid communication with fluid below the valve via a passage extending from the transmitter to below the valve, and wherein the acoustic signal includes an indication of a property of the fluid sensed by the sensor.

23. The system according to claim 19, wherein the transmitter is interconnected in the tubular string above a packer and a valve, the transmitter including a sensor in fluid communication with fluid below the packer via a passage extending from the transmitter to below the packer, and wherein the acoustic signal includes an indication of a property of the fluid sensed by the sensor.

24. The system according to claim 17, wherein the probe is further capable of transmitting the acoustic signal to the remote location in analog electrical form.

25. A downhole acoustic communication system, comprising:

a probe reciprocably and operatively receivable within a tubular string, the probe receiving an acoustic signal, converting the acoustic signal to an analog electrical signal, and transmitting the analog electrical signal to a remote location.

26. The system according to claim 25, wherein the probe is conveyed on a wireline.

27. The system according to claim 25, wherein the acoustic signal is transmitted to the probe from an acoustic transmitter interconnected in the tubular string.

28. The system according to claim 27, wherein the transmitter transmits the signal to the probe in response to a command transmitted from the probe to the transmitter.

29. The system according to claim 28, wherein the command is transmitted acoustically from the probe to the transmitter.

30. The system according to claim 29, wherein the transmitter is interconnected in the tubular string above a valve preventing fluid flow through the tubular string, the transmitter including a sensor in fluid communication with fluid below the valve via a passage extending from the transmitter to below the valve, and wherein the acoustic signal includes an indication of a property of the fluid sensed by the sensor.

31. The system according to claim 29, wherein the transmitter is interconnected in the tubular string above a packer and a valve, the transmitter including a sensor in fluid communication with fluid below the packer via a passage extending from the transmitter to below the packer, and wherein the acoustic signal includes an indication of a property of the fluid sensed by the sensor.

32. The system according to claim 25, wherein the probe includes a digital signal processor converting the acoustic signal into digital electrical form, and wherein the probe is capable of transmitting the acoustic signal to the remote location in digital electrical form.

33. A downhole acoustic communication system for use in a well having a tubular string disposed therein, the system comprising:

a packer interconnected in the tubular string;

a valve interconnected in the tubular string, the valve being operable to prevent fluid flow through the tubular string;

an acoustic transmitter interconnected in the tubular string above the packer and the valve, the transmitter including a sensor sensing a property of a fluid disposed below the packer when the valve prevents fluid flow through the tubular string; and a probe reciprocably received within the tubular string, the probe receiving an acoustic signal from the transmitter, and the signal including an indication of the fluid property sensed by the sensor.

34. The system according to claim 33, wherein the sensor is in communication with the fluid via a passage extending from the transmitter to below the packer.

35. The system according to claim 33, wherein the probe transmits an acoustic command to the transmitter, thereby causing the transmitter to transmit the signal.

36. The system according to claim 33, wherein the probe is conveyed on a wireline.

37. The system according to claim 33, wherein the probe transmits the signal to a remote location in analog electrical form.

38. The system according to claim 33, wherein the signal is digitized in the probe and transmitted to a remote location in digital electrical form.

\* \* \* \* \*